Figure 1:
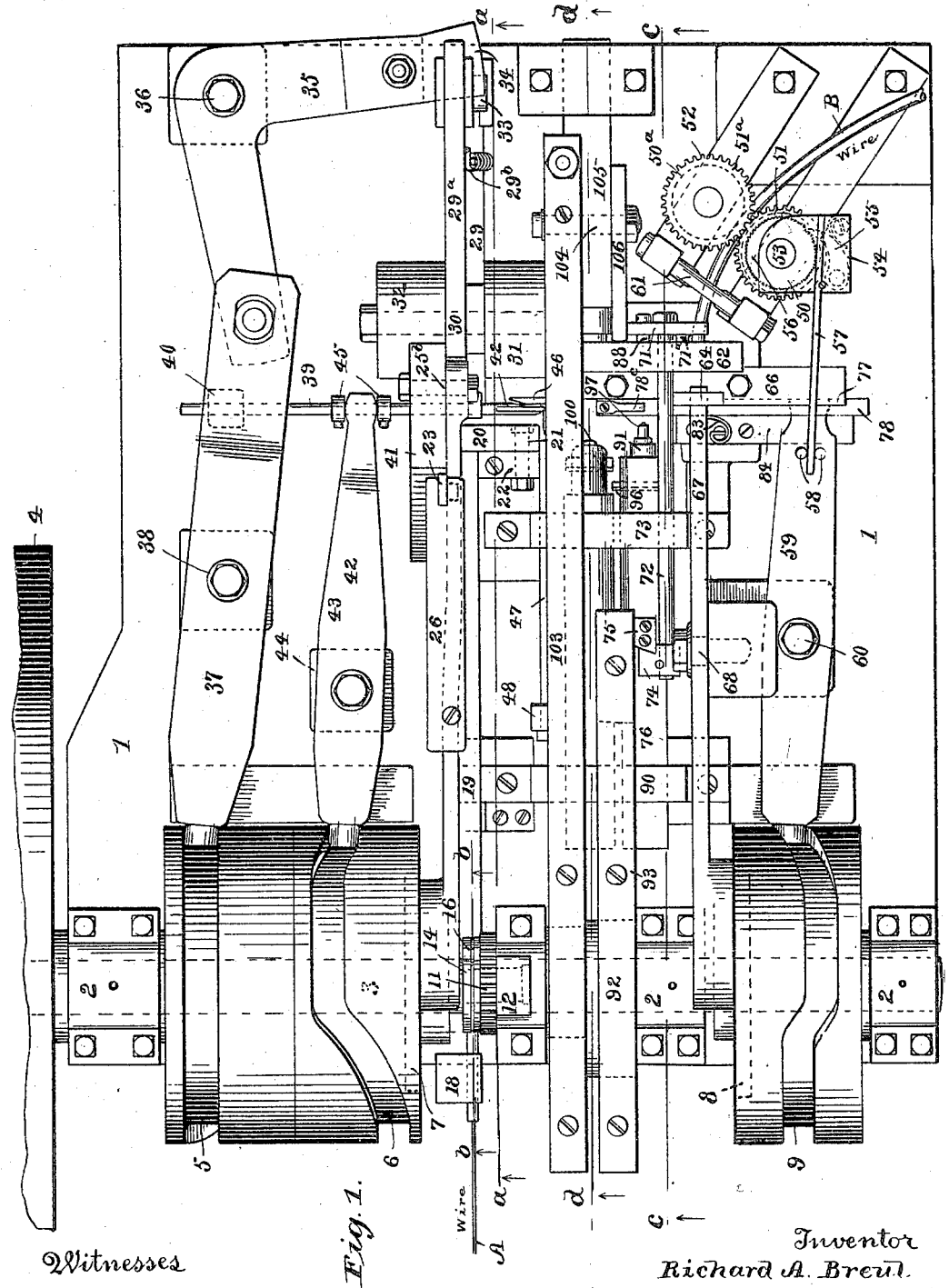

No. 680,839. Patented Aug. 20, 1901.
R. A. BREUL.
FURNITURE NAIL MACHINERY.
(Application filed May 14, 1900.)

(No Model.) 7 Sheets—Sheet 1.

Witnesses
R. H. Newman
Anna Wanamaker.

Inventor
Richard A. Breul.
By
Chamberlain & Newman
Attorneys

No. 680,839. Patented Aug. 20, 1901.
R. A. BREUL.
FURNITURE NAIL MACHINERY.
(Application filed May 14, 1900.)

(No Model.) 7 Sheets—Sheet 2.

Witnesses
R. H. Newman
Anna Wanamaker.

Inventor
Richard A. Breul
By
Chamberlain & Newman
Attorneys

THE NORRIS PETERS CO., PHOTO-LITHO., WASHINGTON, D. C.

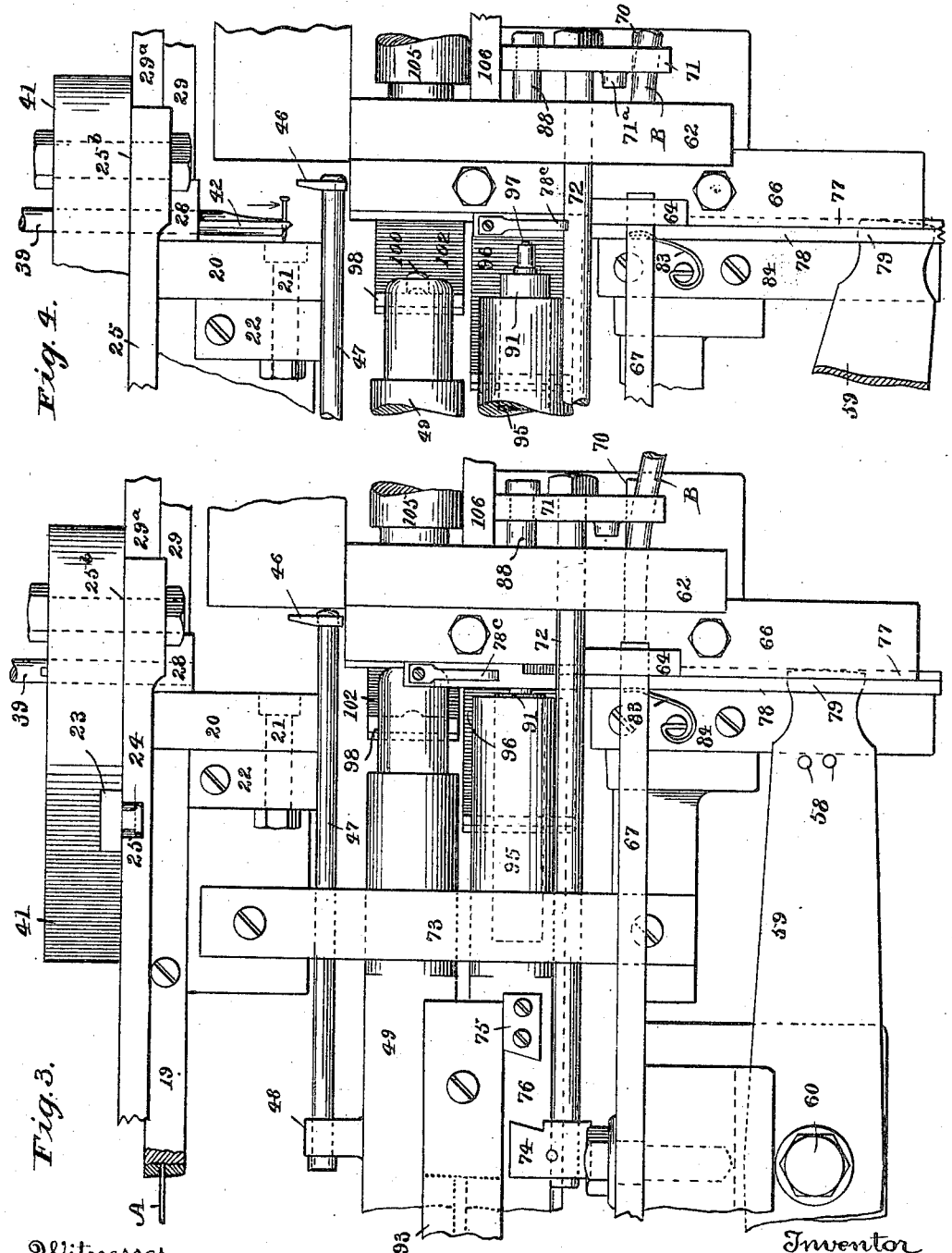

No. 680,839. Patented Aug. 20, 1901.
R. A. BREUL.
FURNITURE NAIL MACHINERY.
(Application filed May 14, 1900.)
(No Model.) 7 Sheets—Sheet 4.
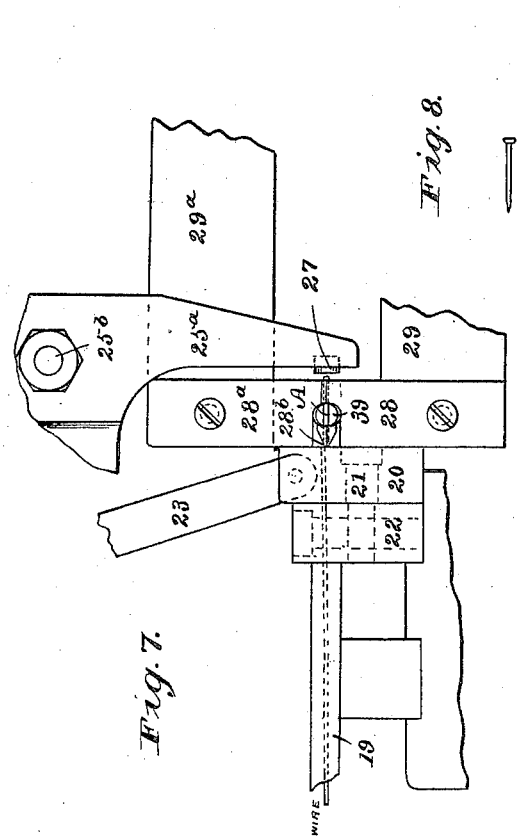
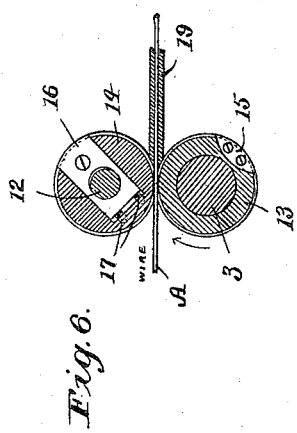
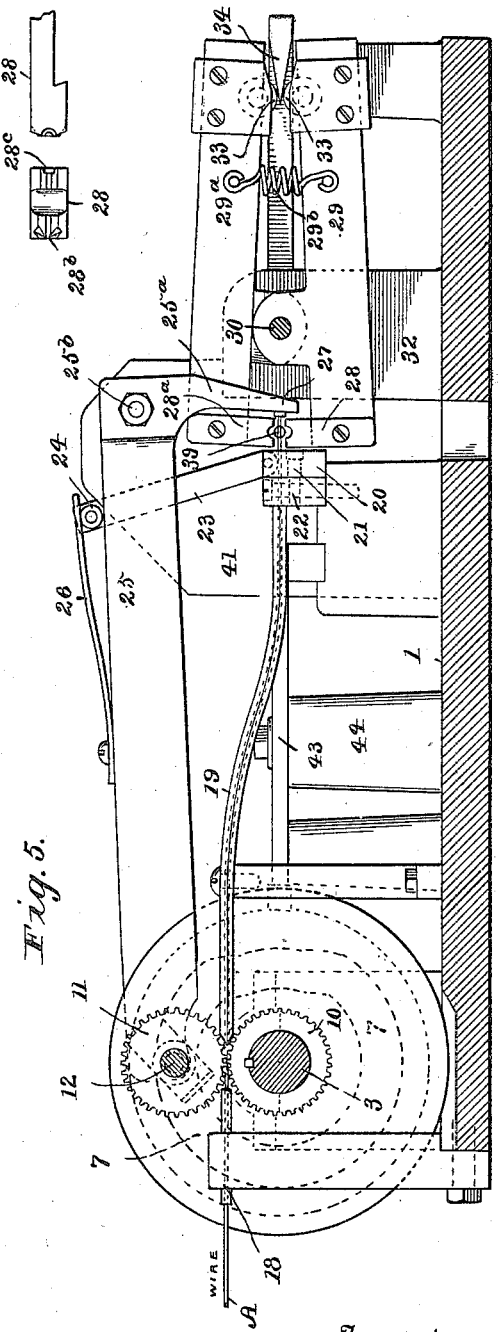
Witnesses
R. H. Newman
Anna Wanamaker
Inventor
Richard A. Breul
By
Chamberlain & Newman
Attorneys No. 680,839. Patented Aug. 20, 1901.
R. A. BREUL.
FURNITURE NAIL MACHINERY.
(Application filed May 14, 1900.)
(No Model.) 7 Sheets—Sheet 5.
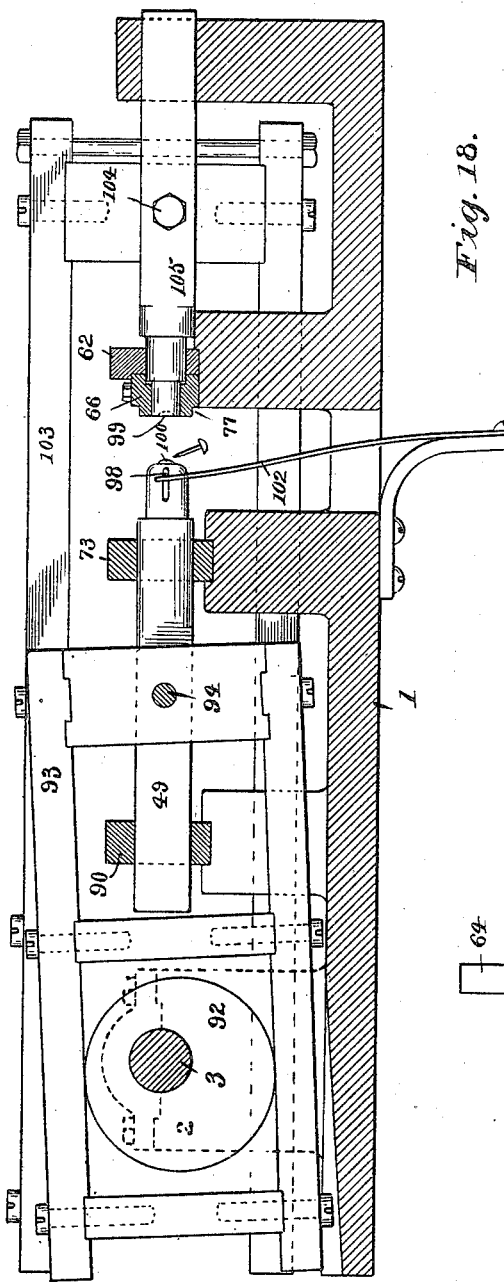
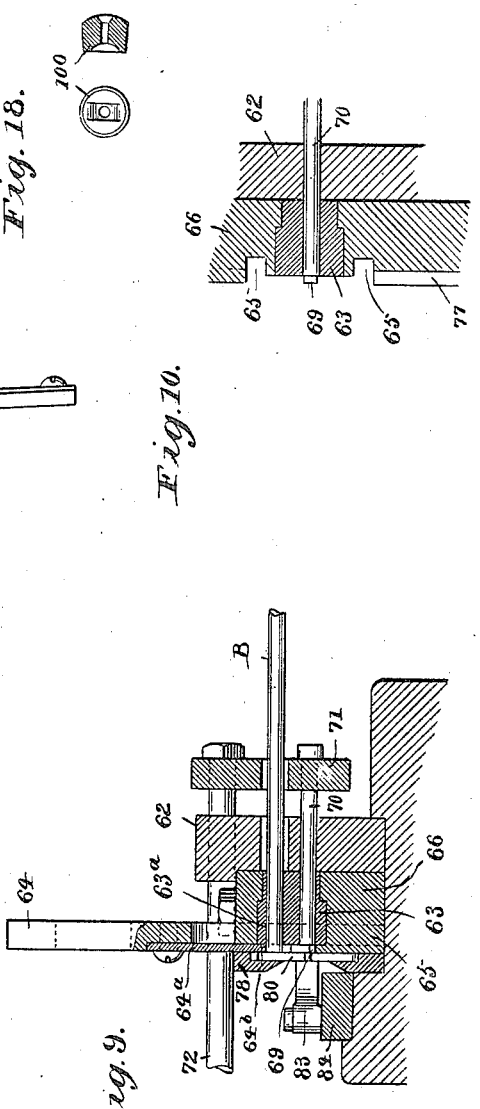
Witnesses
R. H. Newman
Anna Wanamaker
Inventor
Richard A. Breul
By
Chamberlain & Newman
Attorneys No. 680,839. Patented Aug. 20, 1901.
R. A. BREUL.
FURNITURE NAIL MACHINERY.
(Application filed May 14, 1900.)
(No Model.) 7 Sheets—Sheet 6.
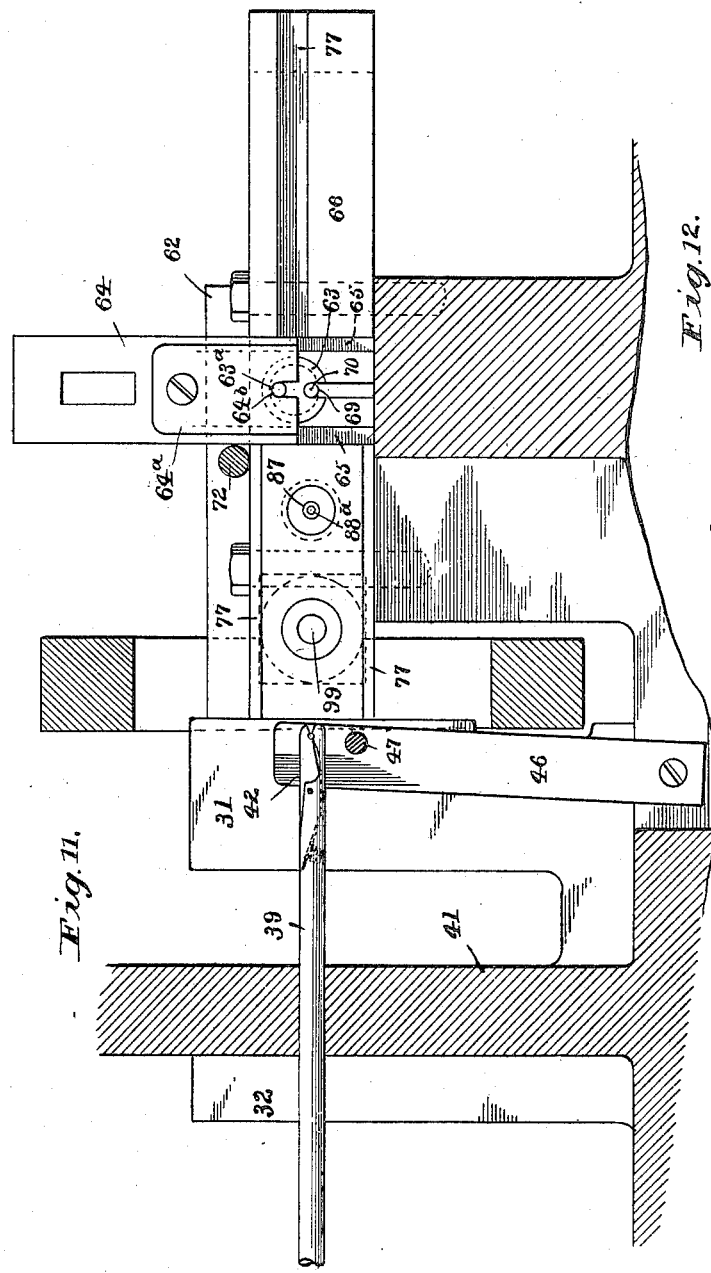
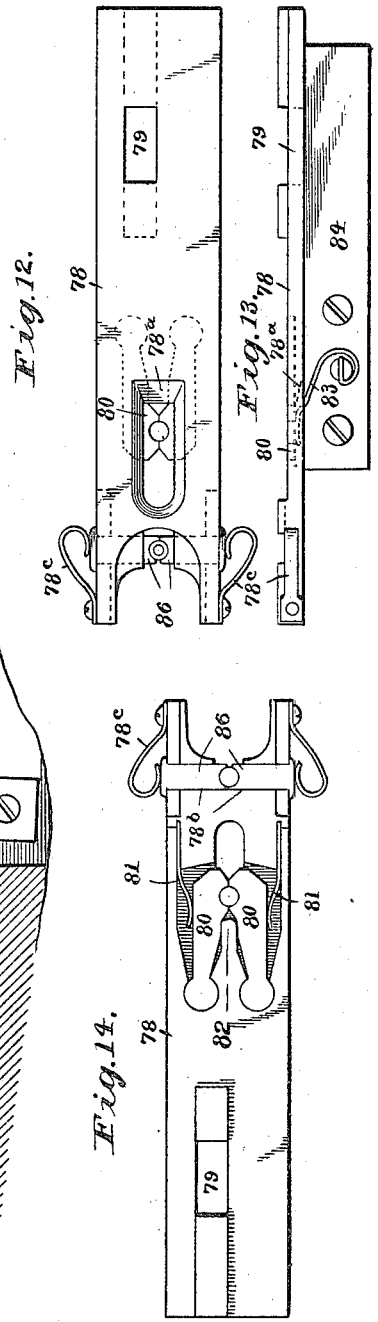
Witnesses
R. H. Newman
Anna Wanamaker.
Inventor
Richard A. Breul
By
Chamberlain & Newman
Attorneys No. 680,839. Patented Aug. 20, 1901.
R. A. BREUL.
FURNITURE NAIL MACHINERY.
(Application filed May 14, 1900.)
(No Model.) 7 Sheets—Sheet 7.
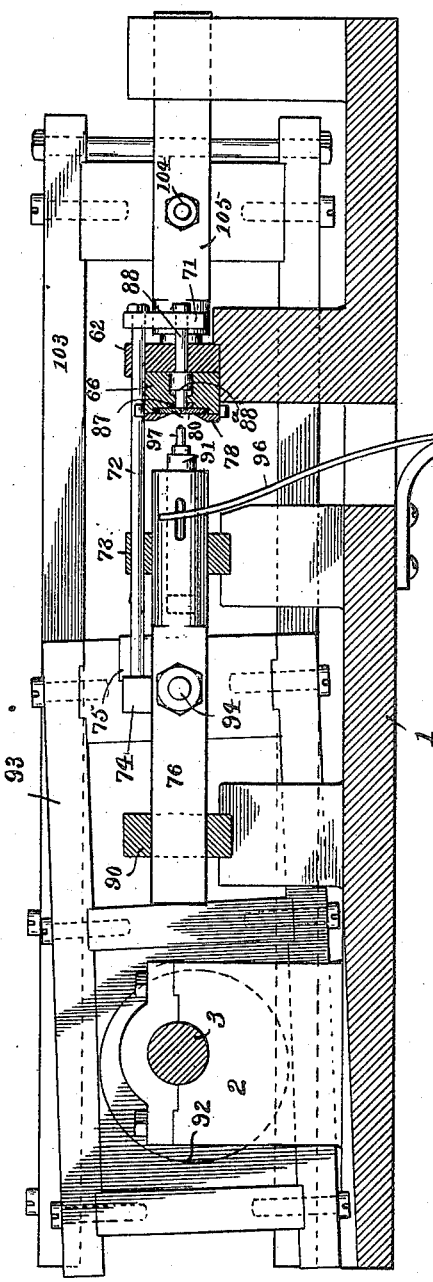
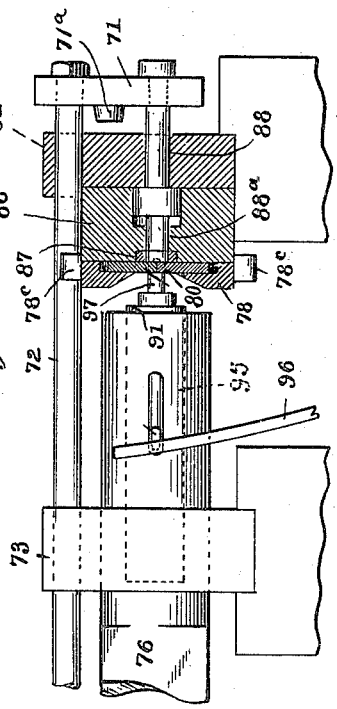
Witnesses
R. H. Newman
Anna Wanamaker.
Inventor
Richard A. Breul
By Chamberlain & Newman
Attorneys ced position
UNITED STATES PATENT OFFICE.

RICHARD A. BREUL, OF BRIDGEPORT, CONNECTICUT.

FURNITURE-NAIL MACHINERY.

SPECIFICATION forming part of Letters Patent No. 680,839, dated August 20, 1901.

Application filed May 14, 1900. Serial No. 16,586. (No model.)

*To all whom it may concern:*

Be it known that I, RICHARD A. BREUL, a citizen of the United States, and a resident of Bridgeport, in the county of Fairfield and State of Connecticut, have invented certain new and useful Improvements in Furniture-Nail Machinery, of which the following is a specification.

My invention relates to new and useful improvements in machines for producing upholstery or furniture nails of the class commonly formed of two pieces of metal and usually consisting of a steel shank and a round brass head.

Heretofore, so far as I am aware, brass-headed nails of the above class have been produced from blanks cut out of sheet-brass and round steel wire. In some instances two separate machines have been employed to form this nail. One of these machines produced the head-blanks and the other the wire-shank blanks and united the two blanks together. By forming head-blanks from sheet metal as above stated a large percentage of scrap is produced, which is objectionable, since it adds materially to the cost of the completed nail.

It is therefore the object of my invention to improve upon nail machinery for the above purpose by producing a machine which is entirely automatic in all its operations and capable of producing a completed furniture-nail without any loss of stock whatever.

As will be later explained, I use wire from which to form both the head and shank blanks. The head-blanks are cut crosswise from a large brass wire which is fed into the machine from a continuous roll. The shank-blanks are also cut from a continuous wire, which is obviously of a smaller diameter and harder metal.

The construction and operation of my machine is such that with each complete rotation of the driving-shaft one completed nail is produced. In the production of this nail, however, a series of substantially five operations upon the blanks are required, and thus when the machine is in operation five blanks are operated upon with each rotation of the machine. These operations consist, first, in severing the shank-blank; second, in the heading of said blank; third, in the cutting off of the head-blank; fourth, in the centering and shaping of the head-blank, and, fifth, in the uniting of the two and the forming of the head.

With the above objects in view my invention resides and consists in the novel construction and combination of the parts illustrated upon the accompanying drawings, forming a part of this specification, upon which similar characters of reference denote like or corresponding parts throughout the several figures, and of which—

Figure 2:
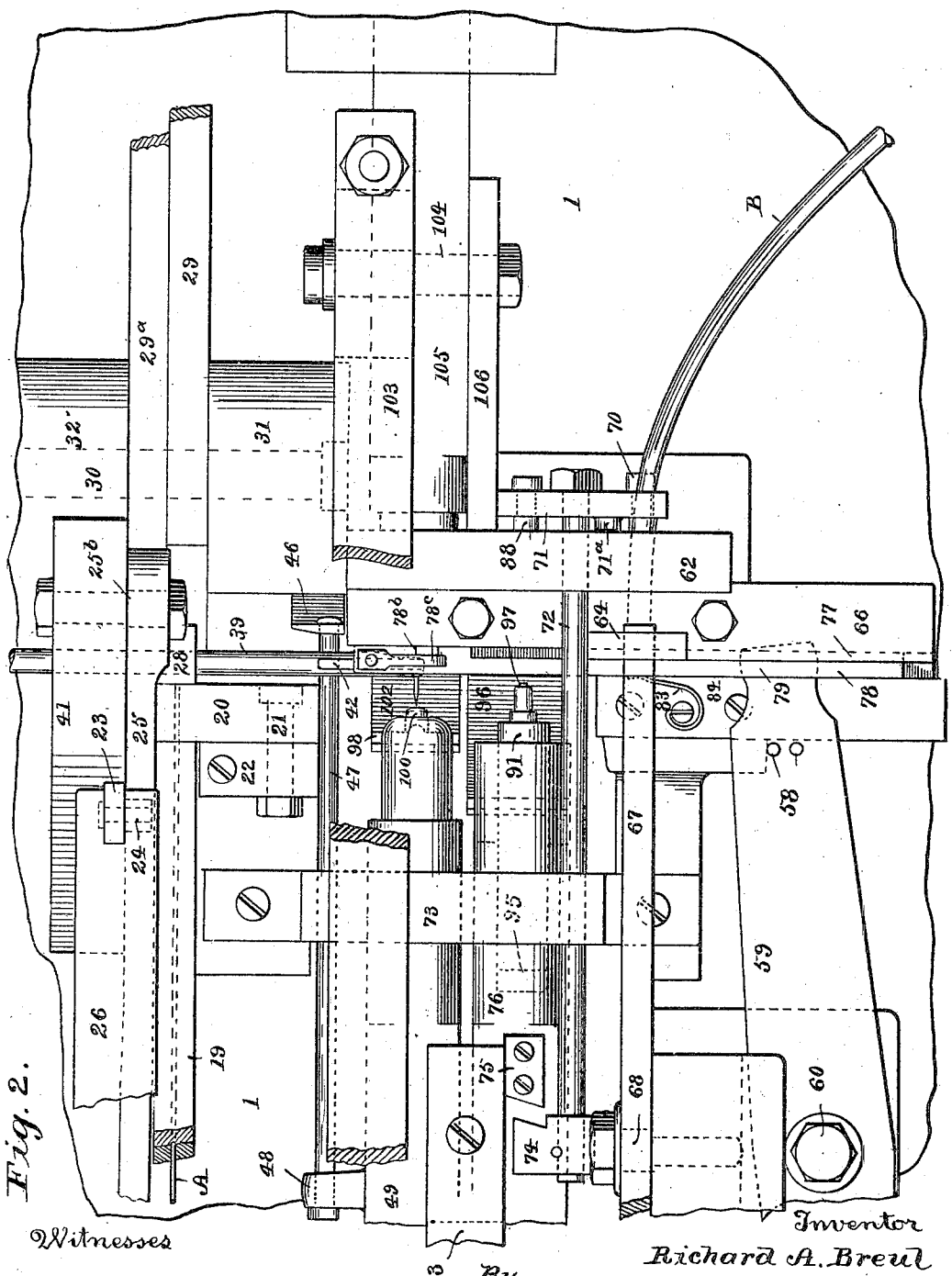

Figure 1 shows a plan view of my improved nail-machine complete. Fig. 2 shows an enlarged detail plan view of the nail-forming tools proper, said tools being in an advanced position from that shown in Fig. 1. Figs. 3 and 4 represent further enlarged details similar to Fig. 2, the position of the parts, however, being changed to indicate advanced operations. Fig. 5 shows a longitudinal section through the nail-shank-forming mechanism, taken on line *a a* of Fig. 1. Fig. 6 is a detail section of the shank-wire feed-rolls, taken on line *b b* of Fig. 1. Fig. 7 is an enlarged detail of the shank-blank-forming tools in an advanced position to that illustrated in Fig. 5. Fig. 8 shows an enlarged view of a shank-blank and a face and edge view of one of the jaws for producing said blank. Figs. 9 and 10 show a central vertical and a horizontal cross-section, respectively, through the head-blank-severing mechanism. Fig. 11 is an enlarged detail front view of the dies in which the head-blanks are retained pending the several operations thereon. Figs. 12, 13, and 14 show a front, a plan, and a rear view, respectively, of the carrier which operates across the face of the dies shown in Fig. 11 and which serves to carry the head-blanks forward for their successive operations. Fig. 15 is a central vertical longitudinal section on line *c c* of Fig. 1, illustrating the mechanism for centering and perfecting the head-blank. Fig. 16 shows an enlarged detail of the head-blank-forming tools in an advanced position from that illustrated in Fig. 15. Fig. 17 is a central vertical longitudinal section through the blank uniting and forming mechanism, taken on line *d d* of Fig. 1. Fig. 18 shows enlarged an end and central sectional view of the movable head-forming die shown in Fig. 17. Figs. 19, 20, 21, and 22 show the head-blank in its various stages and indicate the manner of its attachment to a shank to produce a completed nail.

Referring in detail to the characters of reference marked upon the drawings, 1 indicates the bed of the machine, which in practice may be supported upon suitable legs or a bench, as desired.

2 represents bearings secured to the bed and in which the shaft 3 is journaled, the latter being driven through the medium of a belt-wheel 4. (Shown broken away in Fig. 1.) Upon this shaft is mounted a series of cam-wheels containing cam-grooves 5, 6, 7, 8, and 9, as fully appears in Fig. 1. These cam-grooves engage suitable levers, which in turn engage and operate the several tools and sets of mechanism to form the respective operations upon the two wire blanks.

As before stated, the nail produced by my machine is formed from two distinct wires, the smaller one of which is indicated by A and is fed in from the rear of the machine or left of the drawing, as seen in Fig. 1, while the large wire B for the head-blank is fed in from the lower right-hand corner, as clearly appears in the same figure. Each of these wires is taken from a coil, (not shown,) thus using a continuous automatic supply.

I will first call attention to the feeding mechanism for the shank-wire and then proceed to describe the mechanism for producing the shank-blank therefrom, after which I will refer to the feed for the larger wire and the mechanisms and operations for producing the head-blank therefrom, and finally to describe the mechanism for operating upon and simultaneously uniting the two blanks to produce the completed nail.

Referring to Figs. 1, 5, and 6, it will be seen that upon the main shaft 3 is mounted a small gear 10, which meshes with and drives a similar gear 11, mounted upon a stud 12, immediately above the before-mentioned gear. Each of these gears has secured to one side thereof wire-feed rolls 13 and 14. In the face of these rolls is a groove which clearly appears in the drawings and in which the shank-wire idly lies. Referring especially to Fig. 6, it will be noted that these rolls are each provided with a steel-engaging piece in line of their grooves, which serves to engage and feed the wire inward a given distance, and, as will be obvious, is necessarily of the desired length required to produce a shank-blank. The hardened-steel piece 15 of the lower roll is held rigid in position by means of screws, while the upper piece 16 is fitted in a suitable recess and permitted to yield inward against the resistance of springs 17. This slight movement is desired to compensate for any variations which may appear in the diameter of the wire and also serves to take up wear should the same occur. By reason of the foregoing it will be noted that the rolls in question serve to alternately draw in the wire from a reel (not shown) through a suitable guide 18, as clearly appears in Figs. 1 and 5. The wire is delivered into a hollow channel or guide 19, which serves to pass it through a movable die 20, pivoted at 21 to a fixed block 22. This die 20 is connected to one end of a link 23, the opposite end being provided with a roll 24, which is engaged upon the under side by the edge of a movable lever 25 and upon the top by springs 26, the lever serving to slightly raise the die at predetermined times through the medium of its connections with cam-groove 7 and the spring serving to hold the link down firmly against the arm in its normal position.

In practice the wire in question is fed through the movable die 20 and transporter 39 against header 27, as clearly appears in Fig. 5, exposing an end of wire sufficient in length to produce a nail-shank blank by the following operations thereon: As will be seen, the wire end is shown extended centrally between the two movable jaws 28 and 28$^a$, the operative face of these jaws being alike and clearly shown in Fig. 8. The purpose of said jaws, as will be apparent, is to come together upon the exposed end of the wire in a manner to sever the same close to the movable die by their cutting edges 28$^b$. Said jaws further serve to retain said blank during a slight upward movement of said die, which latter insures the final separation of the metal at said point (see Fig. 7) and finally to retain the blank during the operation of the header 27, which crowds the exposed end of the wire down into the recess 28$^c$ of the die to form the head. The header referred to is mounted in the deflected end 25$^a$ of the lever 25, which latter is pivoted at 25$^b$ and, as before stated, is operated by the cam-groove 7. The jaws 28 and 28$^a$ are carried by levers 29 and 29$^a$, which are pivoted upon bolt 30 and between posts 31 and 32 of the bed. The rear ends of these levers are provided with engaging rolls 33, and between the latter is located the wedge-shaped end 34 of a bell-crank lever 35, the same being pivoted to a stud 36 of the bed. The opposite end of the bell-crank lever is attached by a roller-bearing connection to a straight cam-lever 37, the latter being pivoted to a stud 38 of the bed and carrying a roll to engage the cam-groove 5, before mentioned. From this set of mechanism it will be apparent that at proper intervals the cam-groove serves to operate the intermediate levers in a manner to spread the outer ends of the levers 29 and 29$^a$, thus closing their jaws upon the shank-blank. The return movement of the jaws is accomplished by aid of a coil-spring 29$^b$.

The transporter 39 is for the purpose of receiving the wire and engaging the blank while in the jaws and carrying it forward in line with the head-forming or nail-finishing dies, as will now be described in detail.

Referring to Figs. 1, 2, 3, 4, 7, 8, and 11, it will be seen that the transporter 39 comprises a rod slidably mounted in posts 40 and 41, both of which are secured to the bed. The forward end of this transporter (see Fig. 11) is provided with a spring-actuated jaw 42, which appears upon the top side and operates in connection with a fixed lower jaw, which constitutes the forward extremity of the rod proper. The relative position of the jaws referred to and the tension of the spring is such that the jaws of the transporter will engage the wire as it is fed forward and while in the forming-jaws at 28 and 28ᵇ and with the opening of said jaws carry the shank forward into line with the heading-dies, before referred to, and upon engagement of the shank by said dies the transporter frees itself and returns to its normal position, as will be apparent. The sliding movement of the transporter is obtained through the medium of a cam-lever 43, which is pivoted to a post 44, secured to the bed, one end of said lever being engaged by the cam-groove 8, while the opposite end operates against the collars 45, secured to the transporter. Thus it will be noted that with each rotation of the cam the transporter makes a complete sliding movement. It will be seen that when the nail-shank is grasped in the jaws of the transporter (see Figs. 1, 2, 4, 7, and 8) it is engaged substantially midway of its length and is carried forward (see Fig. 4) in that position until it is brought into line with a shifting device. This shifter comprises a vertically-disposed piece of spring metal 46, secured to the bed, (see Fig. 11,) and to the free end of it a rod 47 is attached, the opposite end of said rod being secured to a lug 48 on a reciprocating slide 49, which latter will be later more fully explained. As the transporter and nail are brought into line with this shifter the slide and its rod operate in a manner to cause the part 46 to engage the head of the nail and gradually force it through the jaws of the transporter until the head is brought up close to said jaws, as shown in Figs. 1 and 2.

As before stated, the head-blank is produced from a heavy brass wire B, which clearly appears in Figs. 1, 2, 9, 10, and 19 of the drawings. This rod is successively fed into the cutting-dies by any suitable feed mechanism—such, for instance, as is shown in Fig. 1, which consists of a pair of feed-rolls 50, operating together by reason of meshing gears 51 and 52, secured thereto. To a stud 53 of one of these gears I pivot a swinging block 54, carrying a spring-actuated pawl 55, which latter engages a fine ratchet-wheel 56 upon the top side of the gear-wheel 51. A spring-arm 57 is secured to the block 54 and its outer end is engaged by pins 58 in a lever 59, the latter being pivoted to a stud 60 of the bed and is operated by cam-groove 9, before mentioned. This lever 59 also serves to operate the head-blank-carrying slide, as will later be again referred to.

From the construction just described it will be noted that with each rotation of the main shaft the lever 59 is forced to and fro, and by reason of its connection with the arm 57 of the block 54 the latter is caused to swing slightly upon its pivot in a manner to draw the pawl back upon the ratchet-wheel and then move the same forward, together with the gears, feed-rolls, and wire, the latter being moved substantially the thickness of a blank. 61 is an adjusting-bolt to provide sufficient tension and pressure of the feed-rolls against the wire, as will be apparent from Fig. 1.

Referring to Figs. 1, 9, 10, 11, and 12, it will be seen that the head-blank referred to is fed in through a plate 62 and is passed into the upper hole 63ᵃ of a cylindrical die-block 63. From this die in practice said wire projects, as shown in Fig. 9, beneath the path of the cutting-blade 64ᵃ and by means of which a blank is severed, the shape of said blank being clearly shown in Fig. 19.

The construction of the cutting-blade referred to and its means of operation will best be understood by reference to Figs. 1, 9, 10, and 11, and from these figures it will be seen that the blade-holding slide operates vertically in ways 65 of the die-holders 66. The upper end of the slide is provided with an orifice for the engagement of a lever 67, which is pivoted at 68 to a post of the bed-plate, the opposite end of the lever being provided with a roller connection to the cam-groove 8, by means of which said lever and slide are operated vertically. The slide is provided with a detachable blade 64ᵃ, which has a slot 64ᵇ central of its lower edge and which constitutes the actual cutting-point of the blade. In practice this slot straddles the projecting end of the wire, and after the blade has severed the wire the blank removed therefrom is carried down against a shoulder 69, (see Figs. 9, 10, and 11,) where, as will be noted, it is retained in line with a plunger 70, slidably mounted within the before-mentioned die 63 and operated by the following connections, (see Figs. 1, 2, 3, and 9:) To the plunger 70 is rigidly secured a plate 71, which is fixed to and carried by a rod 72, the latter being slidably mounted in a guide-bracket 73 and the plate 62, before mentioned. The rear end of this rod is provided with a block 74, which is engaged by a lug 75, secured to the reciprocating slide 76. It will be seen that this engagement is only effected at the two extreme positions of the punch-slide and serves to throw the plate 71 and its tools but a short distance in and out of their dies, its inward movement being limited by a stop 71ᵃ.

Across the face of the cutting-die 63 and in suitable ways 77 of the die-holder 66 is slidably mounted a reciprocating blank-carrier 78. (See Figs. 1, 11, 12, 13, and 14.) This carrier is provided with an orifice 79, by means of which the cam-lever 59, before mentioned, engages and operates the carrier on its way. The carrier serves by a special set of jaws to receive the blank from the cutting-tools and carry it forward to the centering and shaping dies, and, further, contains a second set of mechanism to simultaneously take the blank from the centering and shaping dies to the blank-uniting and head-forming dies.

The mechanism for receiving the blank from the plunger 70 (see Figs. 12, 13, and 14) consists of a pair of swinging jaws 80, having semicircular recesses in their uniting edges of a corresponding size to that of the blank to be engaged therein. These jaws are normally retained in a closed position by springs 81, which are retained in slots of the carrier and have their free ends disposed against the outer edge of the jaws. Centrally of the jaws I employ a stop 82, against which the jaws strike to insure the proper centering when closed and to prevent either from being shoved over out of line of the blank. When the carrier is in the position shown in Figs. 1 and 3, the blank-opening formed in the face of the jaws in question is in direct line with the blank and plunger 70. Consequently with a forward movement of said plunger (see Fig. 9) the blank is shoved off the stop 69 into the recess of said jaws and against the face of a spring 83, which spring, as will be seen, is attached to a stud of a plate 84, secured to the bed of the machine. It will further be noted that this plate also acts to retain the carrier in position, holding it in ways 77, before referred to. The tension and construction of the spring 83 is such that it will ride up and down the incline surface 78$^a$ of the opening in the carrier (see Fig. 12) with the reciprocating movement thereof. The carrier 78 is further provided with a second set of jaws for receiving and shifting the blank from the centering-die to the head-forming dies, which mechanism is also clearly shown in Figs. 12, 13, and 14, and consists of a pair of vertically-disposed jaws 86, the inner faces of which are provided with semicircular recesses to receive the blank. These slides, as will be noticed, operate in suitable ways 78$^b$ of the carrier and are normally forced inward by the action of the springs 78$^c$, which are secured to the top and bottom edges of the carrier. The outer ends of these jaws are provided with overlapping heads, against which the springs operate, and which heads engage the edge of the carrier to limit their inward movement. In the operation of both sets of these jaws it will be seen that the blanks are delivered to and taken from the back and are not received at the side, as might be supposed. Consequently the lateral movement of the jaws amounts to very little.

With the cutting off of the large wire the blank produced is not of a true disk shape, as might be desired, but is of a shape substantially like that shown in Fig. 19, wherein it will be seen that the blank is thicker on the top edge than at the bottom and is also broader one way than another or is what might be termed of a somewhat "oblong" shape. This is obviously caused by the severe strain brought to bear on the blank by the cutting-blade just prior to the severing of the wire. The blank in this shape is shoved in the jaws 80 of the carrier by the plunger 70, whereupon the blank is carried over in front of the centering-die 87, (see Figs. 1, 2, 11, 15, and 16,) which is also in line with the centering and shaping punch 97. This punch, as will be apparent, is mounted in a suitable holder 91, which in turn is slidably mounted in the reciprocating slide 76, which latter is fitted in ways of brackets 73 and 90. This slide, together with a corresponding slide 49, which is situated, connected with, and mounted adjacent thereto, receive their reciprocating movement from an eccentric 92 upon the main shaft through a yoke 93, which latter is pivotally connected to the slides 76 and 49 by bolt 94. It will thus be apparent that with the rotation of the power-shaft 31 an eccentric thereon throws the yoke and slides forward and backward at the proper and predetermined time.

Referring again to Figs. 15 and 16, it will be seen that as the slide 76 and its punch 97 come forward the latter will engage the rough blank and force it from between the jaws 80 of the carrier into the die 87 before mentioned. With a continued forward movement of this slide the punch and holder 91 will slip back into the barrel 95 of said slide against the resistance of spring 96 until said holder fetches up against the end of the barrel, whereupon the punch is carried farther forward and its centering-teat forced into the blank, while the face of the punch presses up against the side of the blank in a manner to both center and spread it out against the walls of the die 87 to form a true symmetrical blank and also a convex teat on the center of the rear face of the blank, which feature greatly facilitates the shaping and finishing of the surface of the head. With the return movement of the slides in question it will be noted that the plate 71 and its rod are operated in a manner to force the second plunger 88 inward against the head of stud 88$^a$, which latter, as will be seen, is fitted into a suitable recess of the die-block. The forward end of this stud engages the back of the centered blank and moves it forward into the second set of jaws 86 of the carrier, whereupon it is again carried forward to the finishing-tool, which latter comprises a stationary die 99 and a movable punch 100, carried by the slide 49, before mentioned.

Referring to Figs. 2, 4, 11, and 17, it will be apparent that the centered blank is delivered in front of die 99 and that the transporter 39 likewise brings forward and delivers the shank in line with said head-blank, whereupon the slide 49 comes forward, causing its punch 100 (see Fig. 18) to receive the pointed end of the shank, pushing said shank forward into the head-blank and, continuing, transfers the latter from the carrier into the recess of the head-die 99. Thereupon the transporter and carrier are quickly withdrawn to allow the dies to meet and to swage the head-blank around the head of the shank, as will be apparent from Fig. 22, illustrating the completed nail. In the rear of the punch 100 of the slide 49 is located a transverse centering-plate 98, which operates in an orifice and is engaged by a spring 102 in a manner similar to that of the punch-holder before mentioned. This plate engages the shank-point as it enters said punch and forces the shank-head into the recess of a head-blank and serves to hold both firmly against the die while the carriers are being released and returned and also while the punch approaches the die. The plate 98 also forces the shank of the finished nail out of punch 100. As a means of compensating for the severe pressure caused by the operation of the punches and dies of these slides I have provided (see Figs. 1 and 17) a second eccentric, yoke, and slide connection 103 from the power-shaft, the forward end of which yoke is connected by a bolt 104 with the slide 105. The throw of the second eccentric and yoke is very little, being only sufficient to slightly tighten up the slide 105 against the rear end of the dies as the punches assume their extreme forward movement. 106 is a brace secured to the slide 105, and it serves as a brace for the die-block when the slides come together.

Having described the construction of the mechanism constituting my improved machine, I will now give a general description of the operation of the same in the manufacture of brass-headed furniture-nails, for which it is designed.

Power is obviously communicated to the machine through the medium of belt-wheel 4, which, together with its shaft, is driven continuously at an approximate speed of about seventy rotations a minute. The shaft in turn communicates motion through the several cam-grooves to their respective levers to perform their individual functions, as will be later referred to in their proper order. The feed-rolls 13 and 14 successively feed in predetermined lengths of wire from a reel, (not shown,) and from this wire the shanks for the nails are produced. After the desired length of wire is fed forward and through the transporter the jaws 28 and 28ª close together upon the wire in a manner to swage and sever the same close to the inner edge of said jaws, after which the movable cutting-die 20 is operated upward slightly to insure a clean cut of the wire blank from the main wire. Next, the header 27 operates to swage the projecting end of the blank back into the head, forming cavities of the jaws, whereupon the jaws open and release the nail-shank held in the transporter, which starts to carry it forward. The transporter moves until the head of the nail carried thereby comes in line with the shifter 46, when the latter is drawn backward through its rod connection 47 by the slide 49 in a manner to shove the nail lengthwise through the jaws until the head of said nail comes practically flush with their face. The transporter and nail then resume their forward journey, which terminates in line with the hollow punch 100, which comes forward and receives the nail and permits the transporter to withdraw. During the latter operations upon the shank the wire for the head-blank has been fed into its die and severed by the cutter 64ª, which also holds and carries the blank down upon the stop. The blank is fed forward into the jaws 80 of the carrier by the plunger 70, after which the carrier operates, carrying the rough blank forward into line with the reciprocating punch 97, which latter comes up against the blank and forces it into the die 87, whereafter the spring 96 gradually yields until the punch-holder 91 fetches up against the bottom of the barrel, in which it is yieldably mounted, and with a continued movement of the slide the punch is forced forward in a manner to cause its teat and face to firmly press the blank and swage it into a true symmetrical disk, with a central indentation and a concave protuberance on the reverse side thereof. As soon as the blank just referred to has been forced into its die from the carrier the latter returns half-way toward its former position, where it remains until the punch 97 has returned from the swaging operation sufficiently to allow the blank-carrier to complete its full return movement. This brings the jaws 80 back into line with the wire-cutting and blank-feeding mechanism, before referred to, and also brings a second set of jaws 86 into line with the centered and completed blank. At the end of the return movement of the slides 49 and 76 the plate 71 and its plungers 70 and 88 are again operated upon in a manner to feed forward both the rough blank from the stop 69 and the centered blank out of the die 87 into the jaws 80 and 86, respectively. The carrier is again thrown forward, bringing the rough blank to the centering-die and the centered blank to the heading-dies, whereupon the latter blank is forced from the carrier by means of its engagement by the head of the shank which has been engaged and is carried forward by the punch 100 in slide 47, forcing the said blank into the recessed die 99. These dies are brought tightly together in a manner to swage the head-blank around the head of the shank-blank and into a finished head, as shown in Fig. 22. With the withdrawal of the slides and the punch 100 the pressure of the spring 102 through the medium of the plate 98 is brought to bear upon the point of the completed nail, and the latter is ejected from the die in a completed state.

Having thus described my invention, what I claim, and desire to secure by Letters Patent, is—

1. In a furniture-nail machine, means for forming flat-head blanks from round metal, consisting of cutting-dies, a double-acting carrier for simultaneously forwarding two different blanks, and dies to properly shape said blanks, substantially as described.

2. In a furniture-nail machine the combination with a die through which a metal rod is successively advanced, a cutting-blade for severing blanks from said rod and arranged to hold and convey them forward into line with a plunger whereby they are removed, a carrier to receive said blanks by the action of said plunger.

3. In a furniture-nail machine, the combination with mechanism for cutting off head-blanks from a round metal rod, of means to shape them into flat disks with a central cavity, mechanism for finally forming said head-blanks into cup shape, a double-acting carrier for simultaneously transferring the blanks from said cutting mechanism to the disk-shaping dies, and also from said latter dies to the cupping and finishing dies.

4. In a furniture-nail machine, the combination with shank-wire-feeding mechanism, wire guiding and cutting-off devices, of dies to point the blank, a transporter operating between the dies and having spring-actuated jaws to receive the wire and hold the nail-shank cut therefrom and transfer the same sidewise from the shank-forming jaws into line with head-blank-supplying mechanism.

5. In a furniture-nail machine, the combination of a die, of an inclosed blade for slicing thin blanks from a metal rod, a plunger to insert the blanks into a carrier, a carrier to shift said blanks to head-blank-forming dies, means for centering and shaping said blanks, substantially as described.

6. In a furniture-nail machine, a die and cutter for cutting nail-head blanks from a metal rod, a stationary stop against which such blanks are brought by the cutter, a plunger to push the blanks into the jaws of a carrier and a spring-stop behind said jaws, substantially as described.

7. In a furniture-nail machine, a blank-feeding plunger to engage the faces of the nail-head blanks, a carrier to shift the blanks, jaws in the carrier to receive and hold the blanks and a spring behind the jaws to properly line the blanks therein.

8. In a furniture-nail machine, the combination of wire-feeding and head-blank-cutting mechanism, of means for placing the blanks against a fixed stop, a carrier to receive and transfer the blanks, a plunger to shove the blanks into the carrier, a shaping-die and a punch having a teat to provide a central cavity in said blank.

9. In a furniture-nail machine, a carrier comprising jaws having semicircular openings corresponding to the diameter of the blanks, a shaping-die, a punch to push the blanks from the carrier into the die and to press them and provide them with a central cavity, a loose plug forming the bottom of the die and arranged to force the prepared blanks out of the die back into the carrier.

10. In a furniture-nail machine, the combination with a die to receive and engage nail-head blanks, of a punch to press the blanks against the bottom and sides of the die and to produce a conical cavity therein, a movable bottom in said die to push out the blanks acted upon, a carrier to receive the blanks and to bring them into line with heading-dies and also into engagement with that part of the nail-shanks to be inclosed by the head-blank.

11. In a furniture-nail machine, the combination in a carrier, of means to receive and deliver nail-head blanks into line of action of a centering punch and die, and separate means to receive them from said centering-die and deliver them into line of action of the head-forming dies.

12. In a furniture-nail machine, a blank-carrier having self-closing jaws to receive a plain nail-head blank, a second set of self-closing jaws to receive an indented and compressed blank, means for reciprocating said carrier, and punches and dies to receive and operate upon said blanks, substantially as described.

13. In a furniture-nail machine, the combination with a carrier, of a blank-shaping punch held in a punch-holder loosely fitted into a slide, a die against which said punch operates, a spring forcing against the holder to cause the punch to shift a nail-head blank from the carrier into said die in combination with dies to engage and shape a head-blank around the headed part of a shank.

14. In a furniture-nail machine, the combination with a blank-cutting die and a carrier, of a blank-shaping punch and die, a slide carrying said punch, means for normally holding said punch in an extended position to yieldably engage and force a blank from the carrier.

15. In a nail-machine the combination with wire-feeding mechanism, of a die to receive a wire, a blade to sever head-blanks from the wire, a stop against which said blanks are placed, a plunger in line with the blank for moving the same, a reciprocating carrier bearing jaws to retain the blank, a die to receive the blank from the jaws, means for forcing the blank from said jaws into the die, and a punch to center and shape said blank.

16. The combination in a furniture-nail machine, of means for forwarding prepared head-blanks and pointing-nail shanks into line with the head-attaching die, a punch, a spring-actuated plate within the punch to engage the shank and insert its head into the cavity of the head-blank and arranged to hold the nail parts in position for the swaging operation.

17. In a furniture-nail machine, the combination of nail-shank-forming mechanism, a reciprocating transporter to grasp and carry a nail-shank into line with heading-dies, a die to receive a head-blank, a movable die to receive the shank and operative connections for uniting it to the head-blank, and means for ejecting the completed nail.

18. In a furniture-nail machine, a transporter to hold the nail-shank during its forming, to carry it along to the heading-dies and into line of engagement with the recess in a head-blank, and means for placing the shank-head therein by shifting said shank laterally while yet in the transporter.

19. In a furniture-nail machine, a transporter to receive a wire end, to hold it while a nail-shank is cut and made therefrom, a shifting device for moving the nail laterally while in transit in the transporter, a hollow punch to receive said nail and unite it to a head-blank in a heading-die and means for ejecting the completed nail.

20. A pair of nail-pointing jaws to simultaneously cut wire lengths and hold the same for heading, a central recess in said jaws for the passage of a transporter to receive the wire end and remove the nail.

21. In a wire-nail machine, a pair of geared wire-feed rolls, one of which is provided with a spring-actuated jaw for feeding the required length of wire by yielding friction.

22. In a wire-nail machine, the combination of a pair of geared wire-feed rolls one of which is provided with a spring-actuated jaw for feeding predetermined lengths of wire, a pair of nail-pointing jaws to simultaneously sever wire lengths, a central recess in said jaws, a transporter to operate in said recess and remove and deliver the wire nail.

23. The combination with suitable wire-feed mechanism and a pair of coacting nail-blank-pointing jaws, of mechanism for deflecting and for severing the feed-wire from the nail-shank being formed within said jaws, a header for producing a head on said shank and independent means within the jaws for holding and removing the nail therefrom, substantially as described.

24. The combination in a furniture-nail machine, of jaws to sever and point a shank, means to head it while in said jaws, a transporter to hold and transfer it, means for sliding it in the jaws of the transporter, head-blank-feeding mechanism, a carrier to receive the blank, a punch and die to center and shape the blank, and means for uniting this to the shank to form a completed nail.

25. The combination with wire-feeding, and shank-forming mechanism, of a transporter to hold and deliver said shank, mechanism for severing a head-blank, means for retaining and placing the blank in a carrier, a die and punch to receive, center and shape the blank, means for uniting the nail parts and dies for shaping and completing the nail.

26. In a nail-forming machine the combination with suitable feeding and cutting mechanism for producing shank and head blanks, a carrier to receive the head-blanks, a transporter to receive the shanks, jaws and dies to shape said blanks and dies to unite the two blanks into a completed nail.

27. In a furniture-nail machine the combination with a sliding carrier, of a push-bar to deposit plain head-blanks in jaws of said carrier, a second push-bar parallel with the first one to deposit prepared head-blanks into a second pair of jaws of the carrier, substantially as shown and described.

28. In a furniture-nail machine, punches on two connected slides for respectively shaping and centering and for swaging and finishing nail-heads, dies to conform to said punches located in a yieldingly-fastened die-holder, in combination with a slide forcing the reverse side of the die-holder simultaneously with the movement of the punches and dies.

Signed at Bridgeport, Fairfield county, Connecticut, this 11th day of May, 1900.

RICHARD A. BREUL.

Witnesses:
C. M. NEWMAN,
EDWARD K. NICHOLSON.